US006748037B1

(12) United States Patent
Katoh et al.

(10) Patent No.: US 6,748,037 B1
(45) Date of Patent: Jun. 8, 2004

(54) DIGITAL BROADCASTING RECEIVER

(75) Inventors: Hisakazu Katoh, Tokyo (JP); Akinori Hashimoto, Tokyo (JP); Kenichi Shiraishi, Yokohama (JP); Akihiro Horii, Zama (JP); Shoji Matuda, Machida (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/554,690

(22) PCT Filed: Dec. 4, 1998

(86) PCT No.: PCT/JP98/05499
§ 371 (c)(1),
(2), (4) Date: May 18, 2000

(87) PCT Pub. No.: WO99/29076
PCT Pub. Date: Jun. 10, 1999

(30) Foreign Application Priority Data

Dec. 4, 1997 (JP) .............................. 9/348719

(51) Int. Cl.[7] .............................................. H04L 27/06
(52) U.S. Cl. ....................................................... 375/344
(58) Field of Search ................................. 375/326, 327, 375/344, 364, 362; 455/132, 255, 257, 250, 263, 265, 314, 315, 179.1, 182.1; 329/304, 306, 307, 345, 346

(56) References Cited

U.S. PATENT DOCUMENTS

| 5,440,268 | A | * | 8/1995 | Taga et al. ................... 329/308 |
| 5,483,686 | A | * | 1/1996 | Saka et al. ................ 455/182.2 |
| 5,832,043 | A | * | 11/1998 | Eory ........................... 375/344 |
| 5,905,405 | A | * | 5/1999 | Ishizawa ..................... 329/308 |
| 6,023,491 | A | * | 2/2000 | Saka et al. ................... 375/326 |
| 6,226,505 | B1 | * | 5/2001 | Uda ............................ 455/255 |

FOREIGN PATENT DOCUMENTS

| JP | 2-189048 | 7/1990 |
| JP | 5-145588 | 6/1993 |
| JP | 6-69972 | 3/1994 |
| JP | 7-162470 | 6/1995 |
| JP | 8-186606 | 7/1996 |
| JP | 9-74431 | 3/1997 |
| JP | 9-186730 | 7/1997 |
| JP | 10-215291 | 8/1998 |

* cited by examiner

Primary Examiner—Emmanuel Bayard
(74) Attorney, Agent, or Firm—Eric J. Robinson; Robinson Intellectual Property Law Office, P.C.

(57) ABSTRACT

A digital broadcasting receiver is provided which can reproduce a carrier quickly and capture a desired signal at high speed. A carrier reproduction phase error detection circuit (6) detects a phase error voltage in accordance with a demodulation output obtained by demodulating a demodulated wave of a modulated wave during a predetermined section in a header section. A peak number calculation circuit (92) calculates an error frequency between a desired reception frequency and a reproduction carrier frequency in accordance with the phase error voltage. A differential coefficient calculation circuit (94) calculates the polarity of the error frequency. A step frequency control circuit (96) converts the calculated error frequency having the calculated polarity into a step frequency width for automatic frequency control. The reproduction carrier frequency is scanned at the converted step frequency width until a frame sync is established after the frame sync is detected. It is therefore possible to reproduce the carrier quickly and capture the desired signal at high speed.

3 Claims, 14 Drawing Sheets

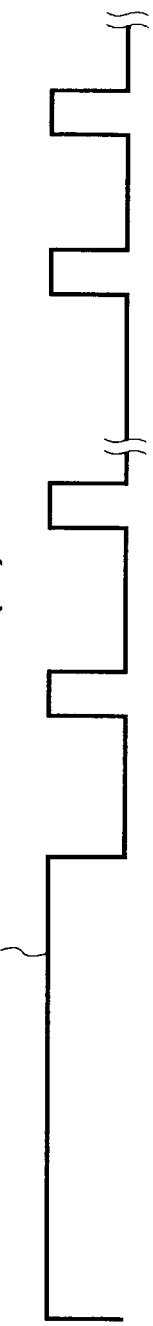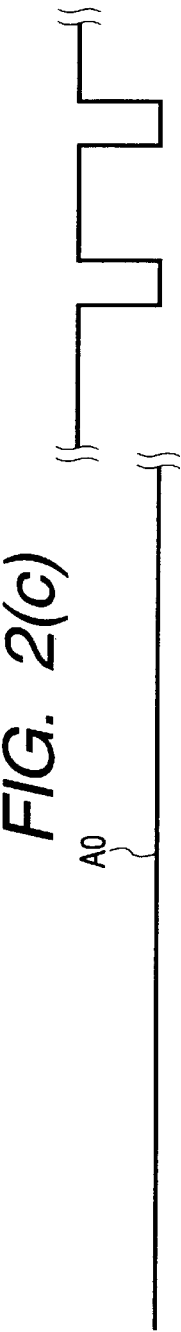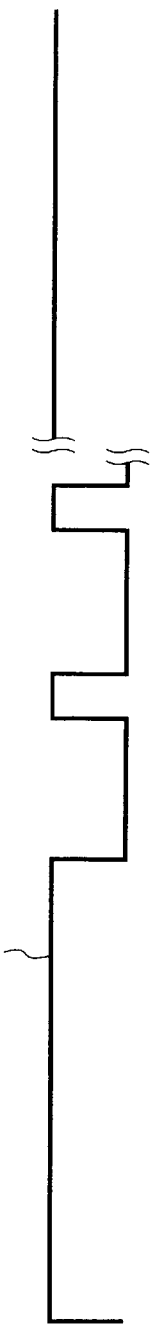

FIG. 4

| TRANSMISSION MODE | HIERARCHICAL COMBINATION |
|---|---|
| 00 | 8PSK |
| 01 | QPSK |
| 10 | 8PSK+QPSK |
| 11 | 8PSK+BPSK |

FIG. 5

| DEMODULATION ROM TABLE | A1 | A0 |
|---|---|---|
| 8PSK | 0 | 0 |
| QPSK | 0 | 1 |
| BPSK | 1 | 0 |

FIG. 6

| LOOP GAIN | LOGIC |
|---|---|
| HIGH | H |
| LOW | L |

| CNR CODE | CNR RANGE |
|---|---|
| 00 | HIGH CNR≧9dB |
| 01 | 4dB≦INTERMEDIATE CNR<9dB |
| 10 | 4dB>LOW CNR |

DIGITAL BROADCASTING RECEIVER

TECHNICAL FIELD

The present invention relates to a digital broadcasting receiver for receiving modulation waves digitally modulated by a plurality of modulation methods, multiplexed in a time axis to be transmitted, and having different necessary C/N (a ratio of carrier power to noise power) values.

BACKGROUND ART

A hierarchical transmission method is known by which digital waves modulated by a plurality of modulation methods and having different necessary C/N values, such as 8PSK modulated waves, QPSK modulated waves, and BPSK modulated waves, are combined in a time axis and repetitively transmitted one frame after another. A digital broadcasting receiver for receiving digitally modulated waves transmitted through such a hierarchical transmission method is provided with an automatic frequency control circuit for reproducing a carrier because the center frequency of a desired reception signal has a deviation of about ±1.5 MHz from a rated frequency.

The automatic frequency control circuit (hereinafter simply called an AFC circuit) for reproducing a carrier of a digital broadcasting receiver for receiving a digitally modulated wave transmitted by the hierarchical transmission method, performs a frequency scanning in a range (capture range) the demodulator can reproduce the carrier even in the case of a worst reception C/N, when the carrier is captured, detects that the carrier reproduction is locked, and thereafter stops the frequency scanning in response to this detection output.

However, the scanning step width of the AFC circuit of a conventional digital broadcasting receiver is narrow so that it takes a time for the carrier reproduction to be locked. The time while the frequency scanning is executed becomes long.

The present invention aims at providing a digital broadcasting receiver capable of quickly reproducing a carrier and capturing a desired signal at high speed.

DISCLOSURE OF THE INVENTION

The invention provides a digital broadcasting receiver having an automatic frequency control circuit used for carrier reproduction for receiving a hierarchical digital modulated wave, the digital broadcasting receiver comprising: phase error detecting means for detecting a phase error voltage in accordance with a demodulation output obtained by demodulating the modulatied wave during a predetermined section in a header section; error frequency calculating means for calculating an error frequency between a desired reception frequency and a reproduction carrier frequency in accordance with the detected phase error voltage; polarity calculating means for calculating a polarity of the error frequency in accordance with the detected phase error voltage; and converting means for converting the detected error frequency having the calculated polarity into a step frequency width for automatic frequency control, wherein the reproduction carrier frequency is scanned at the converted step frequency width until a frame sync is established after the frame sync is detected.

According to the digital broadcasting receiver of this invention, after the frame sync is detected, a phase error voltage is detected in accordance with a demodulation output obtained by demodulating the modulated wave during a predetermined section in a header section. An error frequency between a desired reception frequency and a reproduction carrier frequency is calculated in accordance with the detected phase error voltage. A polarity of the error frequency is calculated in accordance with the detected phase error voltage. The detected error frequency having the calculated polarity is converted into a step frequency width for automatic frequency control. The reproduction carrier frequency is scanned at the converted step frequency width until the frame sync is established. Since the frequency scanning is executed at the step frequency width corresponding to the error frequency until the frame sync is established after it is detected, the carrier can be reproduced quickly and the desired signal can be captured at high speed.

The digital broadcasting receiver of this invention further comprises a tracking circuit for generating a tracking signal in accordance with the phase error voltage, to thereby make the reproduction carrier frequency follow a change in the desired reception frequency in accordance with the tracking signal, after the frame sync is established.

According to the digital broadcasting receiver of this invention, after the frame sync is established, the tracking signal output from the tracking circuit makes the carrier frequency follow the change in the desired reception frequency so that the frame sync state can be maintained.

BRIEF DESCRIPTION OF THE DRAWINGS

FIGS. 2(a) to 2(d) are diagrams showing the structure of a frame used by a hierarchical transmission method and waveforms of signals A1 and A0, according to the embodiment of the invention.

FIG. 4 is a diagram showing the relation between a transmission mode and a hierarchical combination used by a transmission mode judging circuit of the digital broadcasting receiver according to the embodiment of the invention.

FIG. 5 is a diagram illustrating a demodulation ROM table of the digital broadcasting receiver according to the embodiment of the invention.

FIG. 6 is a diagram showing the relation between a loop gain and a logical value of a gain control circuit of the digital broadcasting receiver according to the embodiment of the invention.

DETAILED DESCRIPTION OF THE PREFERRED EMBODIMENTS

Preferred embodiments of a digital broadcasting receiver of this invention will be described.

Figure 1:
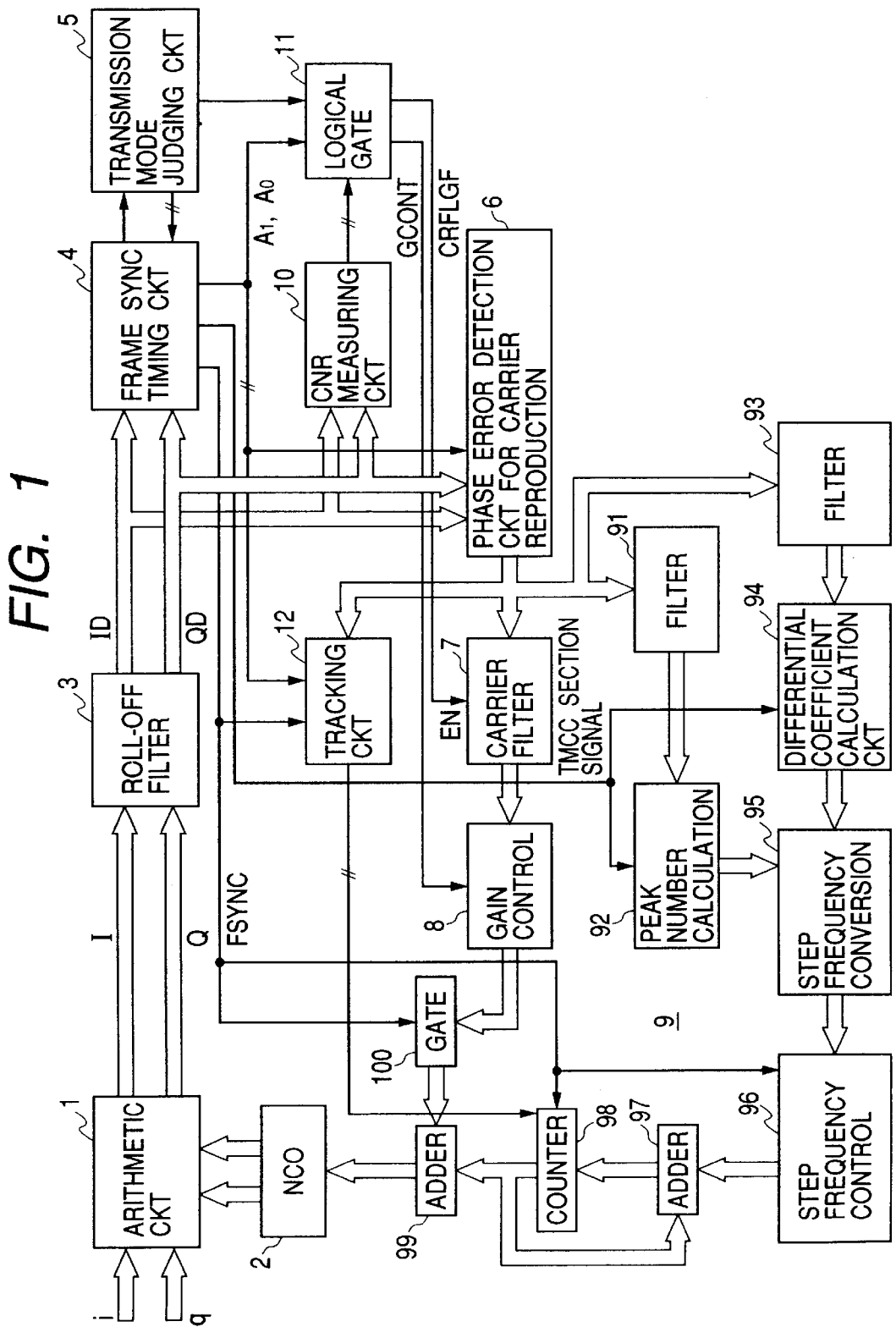
FIG. 1 is a block diagram showing the structure of the main part of a digital broadcasting receiver according to an embodiment of the invention.

FIG. 1 is a block diagram showing the structure of a main portion including an AFC circuit of a digital broadcasting receiver according to an embodiment of the invention.

Prior to describing the digital broadcasting receiver according to the embodiment of the invention, the structure of a frame used by the hierarchical transmission system will be described. FIG. 2(a) is a diagram showing an example of the frame structure used by the hierarchical transmission system. One frame is constituted of one header of 192 symbols and a plurality of pairs of 203 symbols and 4 symbols, totalling in 39936 symbols.

More specifically, one frame is constituted of: a frame sync pattern (BPSK) of 32 symbols (used by sync detection of predetermined 20 symbols; a transmission and multiplexing configuration control pattern (TMCC) (BPSK) of 128 symbols for transmission multiplexing configuration identification; a super-frame identification information pattern of 32 symbols; a main signal (TC8PSK) of 203 symbols and a burst symbol signal (BPSK) of 4 symbols (indicated by BS in FIG. 2(a)) to be BPSK modulated by a quasi-random signal set per each frame period; a main signal (TC8PSK) of 203 symbols and a burst symbol signal of 4 symbols; , , , ; a main signal (QPSK) of 203 symbols and a burst symbol signal of 4 symbols; and a main signal (QPSK) of 203 symbols and a burst symbol signal of 4 symbols, respectively arranged in this order. 8 frames are called a super-frame and the super-frame identification information pattern is used for identifying the super-frame. 192 symbols from the frame sync pattern to the super-frame identification information pattern is also called the header.

Next, revering back to FIG. 1, the digital broadcasting receiver according to the embodiment of the invention will be described. The digital broadcasting receiver has an arithmetic circuit 1, a numerical control oscillator 2, a roll-off filer 3 made of a digital filter having the raised cosine characteristics, a frame sync timing circuit 4, a transmission mode judging circuit 5, a carrier reproduction phase error detection circuit 6, a carrier filer 7 made of a low-pass digital filter, a gain control circuit 8, an AFC automatic frequency control) circuit 9, a CNR measuring circuit 10, a logical gate circuit 11, and a tracking circuit 12.

The AFC circuit 9 will be described. In the AFC circuit 9, a step frequency control circuit 96 generates a step frequency control voltage and supplies it to an adder 97, for the frequency scanning at an initially set frequency step width, e.g., 600 kHz width. Each time the step frequency control voltage is output to the adder 97, a load signal is supplied to a counter 98 to load the output of the adder 97 in the counter 98 to thereby execute cumulative addition during one frame period in cooperation with the adder 97. A count of the counter 98 is output to an adder 99. After the frame sync is detected, the adder 99 adds the count of the counter 98 and an output of the gain control circuit 8 (to be later described) supplied via a gate circuit 100 which is controlled to be conductive in accordance with calculation of an error frequency and its polarity after the frame sync detection. This addition result is output to the numerical control oscillator 2 to control the frequency controlled oscillator 2 and reproduce the carrier through automatic frequency control.

During the frame sync detection, the gate circuit 100 is controlled in a closed state.

The operation after the frame sync detection will be detailed. The AFC circuit 9 supplies a phase error voltage output from the carrier reproduction phase error detection circuit 6 to digital filters 91 and 93 in which noises are removed. A peak number calculation circuit 92 calculates, from a phase error voltage output from the digital filter 91, a peak number representative of a difference (error frequency) between a desired reception frequency and a carrier frequency during the TMCC section. A differential coefficient calculation circuit 94 calculates, from a phase error voltage output from the digital filter 93, the direction of a differential coefficient representative of the polarity of the error frequency during the TMCC section. Upon reception of the calculated peak number and the calculated direction of the differential coefficient, a step frequency conversion circuit 95 converts them into a frequency scanning width which has a predetermined step frequency, e.g., 65 kHz, multiplied by the calculated peak number and has the direction of the differential coefficient. In accordance with not the initially set frequency step width but the frequency step width converted by the step frequency conversion circuit 95, a corresponding step frequency control voltage is generated and supplied to the adder 97 in order to execute automatic frequency control through frequency scanning.

After the automatic frequency control with the changed step frequency width, the gate circuit 100 having been in the closed state is controlled to be conductive. Therefore, the frequency scanning is performed at the predetermined frequency step width in the capture range, e.g., 8 kHz width, until a frame sync is established. After the frame sync is established, the carrier frequency is controlled to follow a change in the frequency of the desired reception signal, in accordance with a tracking signal output from the tracking circuit 12 in accordance with the phase error voltage.

Figure 3:
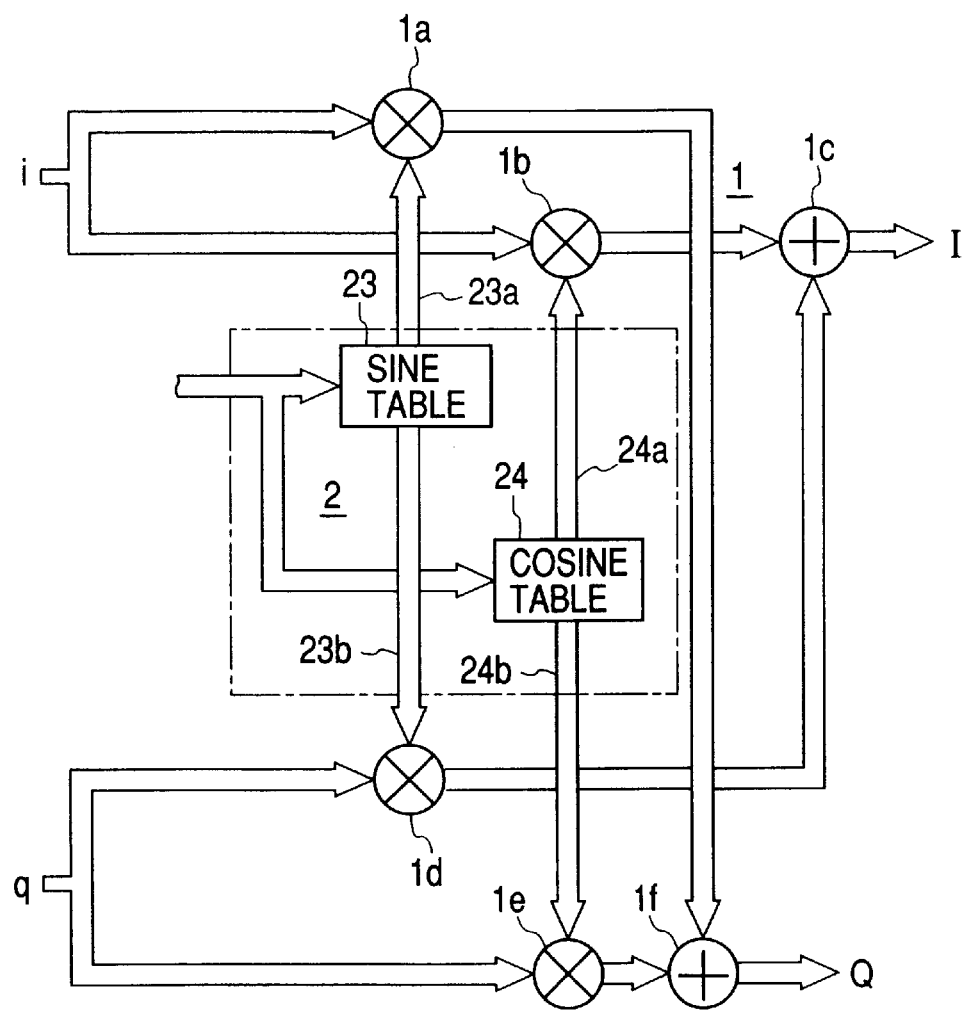
FIG. 3 is a block diagram showing the structure of an arithmetic circuit and a numerical control oscillator of the digital broadcasting receiver according to the embodiment of the invention.

As shown in FIG. 3, the numerical control oscillator 2 has a sine table 23 for receiving an addition output from the adder 99 and outputting sine data 23a and 23b of opposite polarities and a cosine table 24 for receiving the addition output of the adder 99 and outputting cosine data 24a and 24b. In accordance with the output from the adder 99, the numerical control oscillator 2 outputs the sine data 23a and 23b and cosine data 24a and 24b of opposite polarities, to output sine and cosine signals of opposite polarities which substantially form a reproduction carrier in cooperation with the AFC circuit 9.

The arithmetic circuit 1 has as shown in FIG. 3: a multiplier 1a for multiplying a quasi-sync detected I axis baseband signal i by the sine data 23a; a multiplier 1b for multiplying the baseband signal i by the cosine data 24a; a multiplier 1d for multiplying a quasi-sync detected Q axis baseband signal q by the opposite polarity sine data 23b; a multiplier 1e for multiplying the baseband signal q by the cosine data 24b; an adder 1c for adding outputs of the multipliers 1b and 1d and outputting the addition result as a baseband signal I; and an adder 1f for adding outputs of the multipliers 1a and 1e and outputting the addition result as a baseband signal Q. The arithmetic circuit 1 therefore tunes the frequencies of the baseband signals i and q and outputs the frequency tuned baseband signals I and Q to the roll-off filter 3.

Upon reception of baseband signals ID and QD output from the roll-off filter 3, the frame sync timing circuit 4 outputs a TMCC pattern to the transmission mode judging circuit 5. In accordance with the decoded result of the TMCC pattern, the transmission mode judging circuit 5 supplies the frame sync timing circuit 4 with a 2-bit transmission mode signal shown in FIG. 4 and representing a hierarchical combination of: a high hierarchical 8PSK signal (demodulated from the 8PSK modulated signal); a low hierarchical QPSK signal (demodulated from the QPSK modulated signal); the 8PSK signal and QPSK signal; and the 8PSK signal and BPSK signal (demodulated from the BPSK modulated signal).

As shown in FIG. 4, the transmission mode signal takes a value "00" for the 8PSK signal, a value "01" for the QPSK signal, a value "10" for the 8PSK signal and QPSK signal, and a value "11" for the 8PSK signal and BPSK signal.

The frame sync timing circuit 4 receives the baseband signals ID and QD to detect a sync pattern and output a frame sync signal FSYNC, and also receives the transmission mode signal to output a signal A1 shown in FIG. 2(b) which takes a high level during the header section and burst symbol signal section, and a signal A0 shown in FIG. 2(c) which takes a high level during the QPSk signal section.

The carrier reproduction phase error detection circuit 6 receives the baseband signals ID and QD and signals A1 and A0 to detect a phase error and output a phase error voltage corresponding to the detected phase error. More specifically, the carrier reproduction phase error detection circuit 6 is provided with a phase error table for the BPSK signal shown in FIG. 7, a phase error table for the QPSK signal shown in FIG. 8, and a phase error table for the 8PSK signal shown in FIG. 9. The carrier reproduction phase error detection circuit 6 judges the transmission mode in accordance with the signals A1 and A0, selects the phase error table in accordance with the judged transmission mode, obtains the phase from the signal point arrangement of the baseband signals ID and QD, and outputs a phase error voltage corresponding to the phase to the carrier filer 7 and digital filters 91 and 93.

Figure 7A:
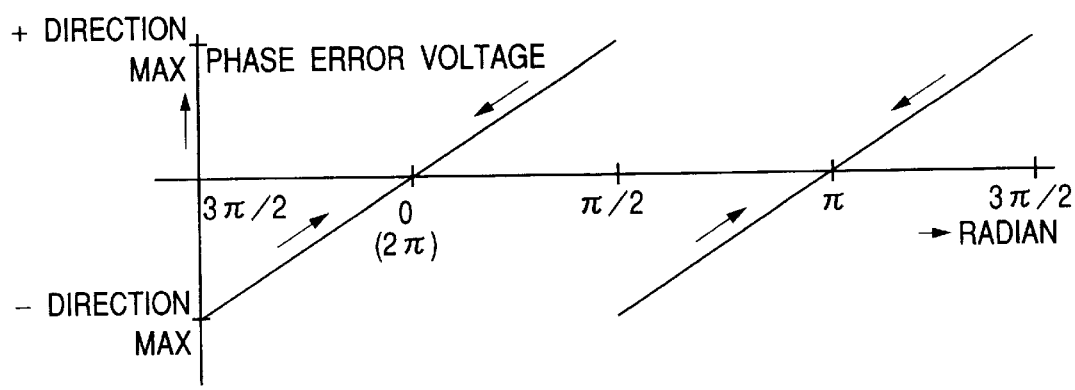
FIGS. 7(a) and 7(b) are diagrams illustrating a phase error table (for a BPSK signal) of the digital broadcasting receiver according to the embodiment of the invention.
Figure 7B:
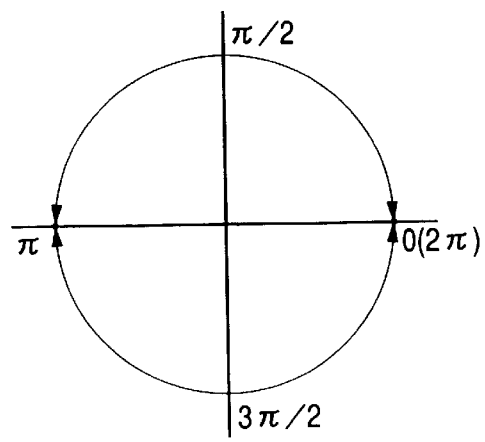

For example, if it is judged that the transmission mode corresponds to the BPSK signal (signals A1 and A0 are "1, 0") having the standard positions of the signal points at 0 ($2\pi$) radian and $\pi$ radian, then the carrier reproduction phase error detection circuit 6 selects the phase error table shown in FIGS. 7(a) and 7(b), and outputs: a negative phase error voltage shown in FIG. 7(a) for the phase in an increase direction in the range from the phase equal to or larger than $3\pi/2$ radian to the phase smaller than 0 ($2\pi$) radian; a positive phase error voltage shown in FIG. 7(a) for the phase in a decrease direction in the range from the phase smaller than $\pi/2$ radian to the phase larger than 0 ($2\pi$) radian; a negative phase error voltage shown in FIG. 7(a) for the phase in an increase direction in the range from the phase equal to or larger than $\pi/2$ radian to the phase smaller than $\pi$ radian; and a positive phase error voltage shown in FIG. 7(a) for the phase in a decrease direction in the range from the phase smaller than $3\pi/2$ radian to the phase larger than $\pi$ radian. The phase error voltage takes the maximum value in the increase (+) direction at $3\pi/4$ radian and the maximum value in the decrease (−) direction at $\pi/4$ radian.

Figure 8A:
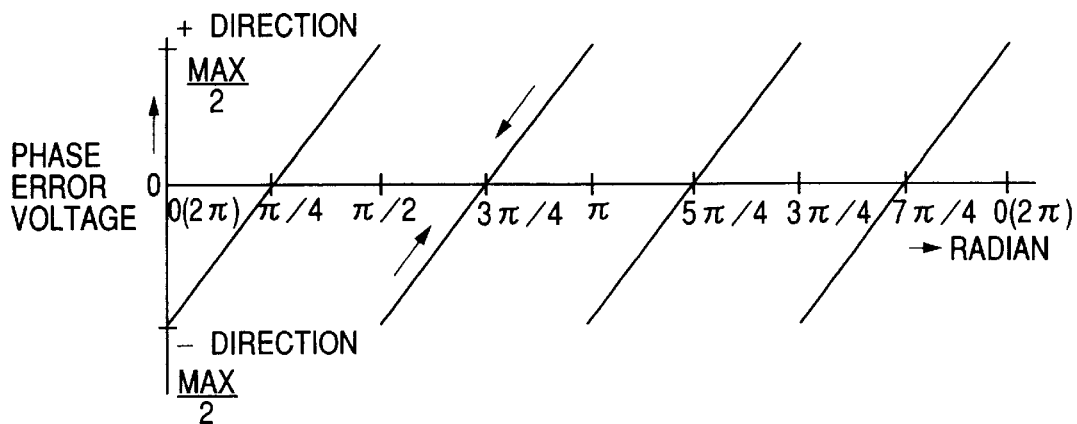
FIGS. 8(a) and 8(b) are diagrams illustrating a phase error table (for a QPSK signal) of the digital broadcasting receiver according to the embodiment of the invention.
Figure 8B:
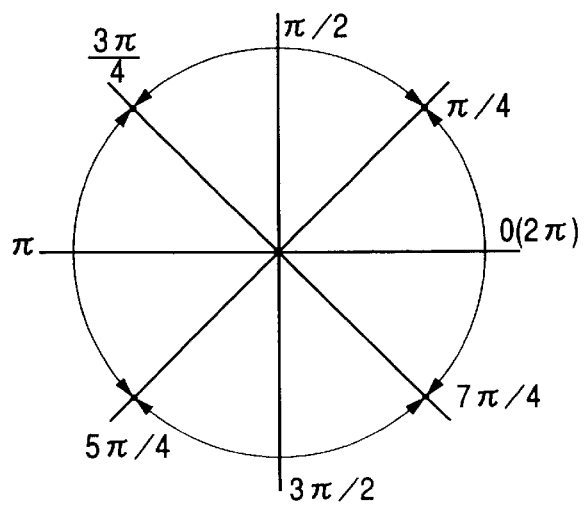

If it is judged that the transmission mode corresponds to the QPSK signal (signals A1 and A0 are "0, 1") having the standard positions of the signal points at $\pi/4$ radian, $3\pi/4$ radian, $5\pi/4$ radian and $7\pi/4$ radian, then the carrier reproduction phase error detection circuit 6 selects the phase error table shown in FIG. 8. In this case, the phase error voltage takes the + direction maximum value or − direction maximum value at the phase of 0 ($2\pi$) radian, $\pi/2$ radian, $\pi$ radian or $3\pi/4$ radian, the maximum value being a half of that of the BPSK signal. The description for the phase error voltage to be output when the transmission mode corresponds to the QPSK signal is omitted, since this can be easily understood from the description for the transmission mode for the BPSK signal.

Figure 9A:
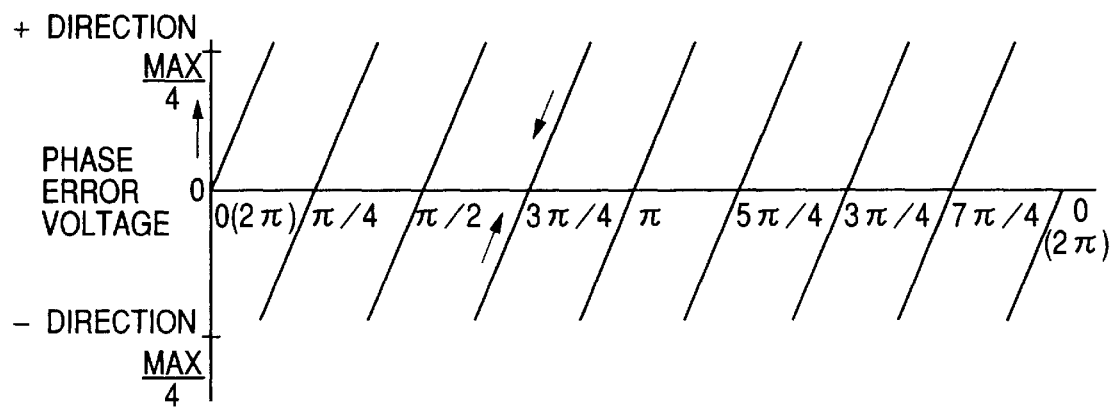
FIGS. 9(a) and 9(b) are diagrams illustrating a phase error table (for an 8PSK signal) of the digital broadcasting receiver according to the embodiment of the invention.
Figure 9B:
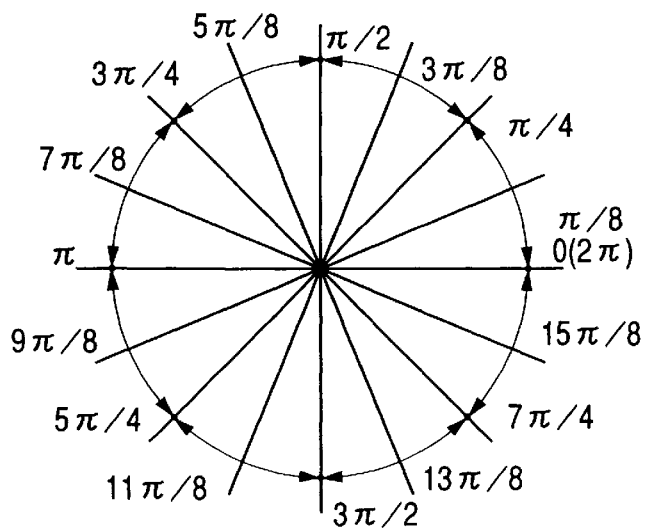

If it is judged that the transmission mode corresponds to the 8PSK signal (signals A1 and A0 are "0, 0"), then the carrier reproduction phase error detection circuit 6 selects the phase error table shown in FIG. 9, and the standard positions of the signal points are at 0 ($2\pi$) radian, $\pi/4$ radian, $\pi/2$ radian, $3\pi/4$ radian, $\pi$ radian, $5\pi/4$ radian, $3\pi/2$ radian and 7 $\pi/4$ radian. In this case, the phase error voltage takes the + direction maximum value or − direction maximum value at the phase of $\pi/8$ radian, $3\pi/8$ radian, $5\pi/8$ radian, $7\pi/8$ radian, $9\pi/8$ radian, $11\pi/8$ radian, $13\pi/8$ radian, or $15\pi/8$ radian, the maximum value being a quarter of that of the BPSK signal. The description for the phase error voltage to be output when the transmission mode corresponds to the 8PSK signal is omitted, since this can be easily understood from the description for the transmission mode for the BPSK signal.

The phase error voltage output from the carrier reproduction phase error detection circuit 6 is supplied to the carrier filter 7 made of a digital low-pass filter to smooth the phase error voltage. In this case, the filtering operation is selectively executed in accordance with a CNR code output from the logical gate circuit 11 to be described later and with a carrier filter control signal (CRFLGP) suitable for the mode identified by the signals A1 and A0.

An output of the carrier filter 7 is supplied to the gain control circuit 8 which controls the gain in accordance with a gain control signal (GCONT) output from the logical gate circuit 11 for each of a high C/N value and an intermediate C/N value. For example, as shown in FIG. 6, if the gain control signal (GCONT) takes a high potential, a high gain, such as a gain of amplifying the output of the carrier filter two times, is set, whereas if the gain control signal (GCONT) takes a low potential, a low gain, such as a unity gain of outputting the output of the carrier filter 7 as it is, is set. An output of the gain control circuit 8 is supplied via the gate circuit 100 to the adder 99 which adds it to the count of the counter 98 to speed up the change in the oscillation frequency of the numerical control oscillator 2.

Figure 10:
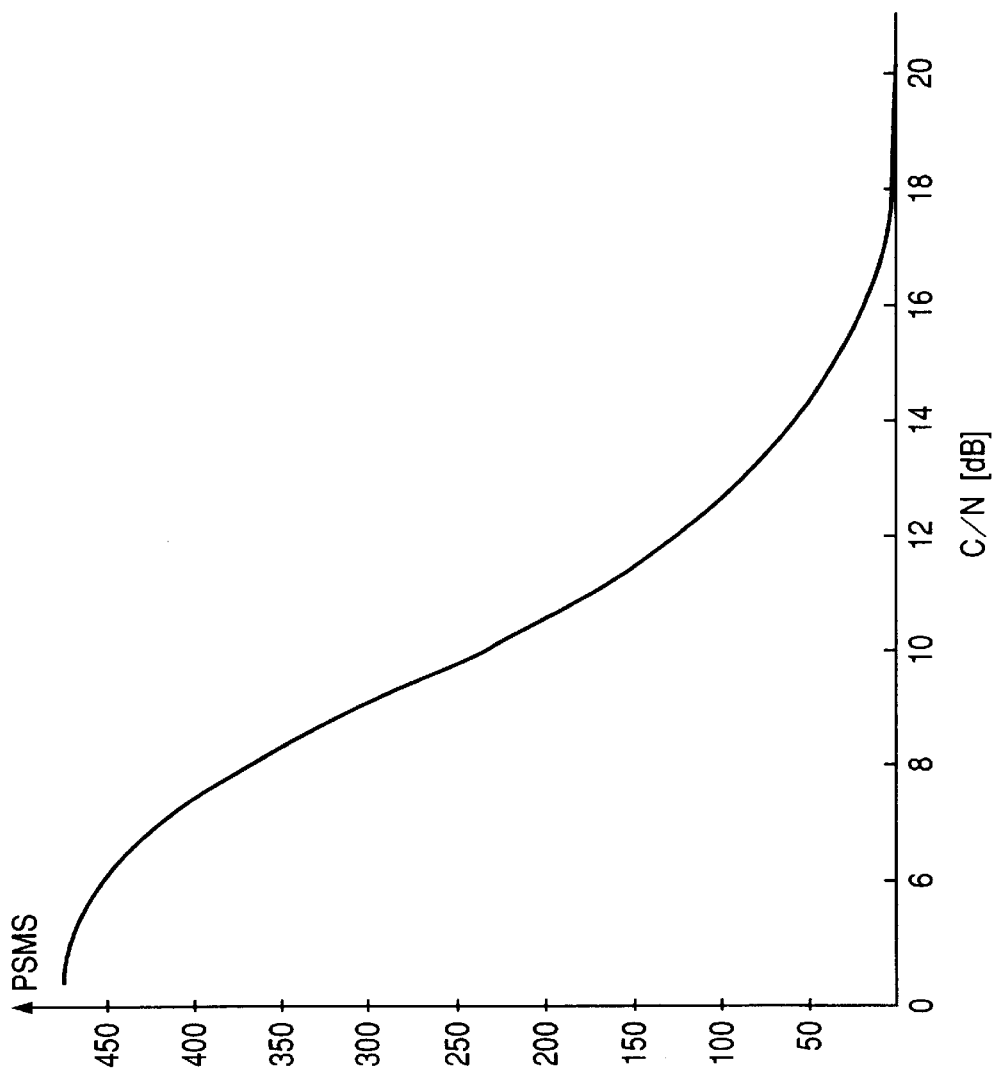
FIG. 10 is a characteristic diagram illustrating CNR measurements by the digital broadcasting receiver according to the embodiment of the invention.

The CNR measuring circuit 10 receives the baseband signals ID and QD, calculates a dispersion value of the signal point arrangement data obtained from the baseband signals ID and QD, compares the dispersion value with a predetermined threshold value, counts the number (DSMS) of occurrences of a dispersion value in excess of the threshold value per a predetermined unit time, and refers to a table shown in FIG. 10 formed through experiments by using the occurrence frequency (DSMS) as a search key to thereby obtain a C/N value which is output as a 2-bit CNR code. For example, as shown in FIG. 11, the CNR code takes a value "00" at a high CNR equal to or larger than 9 dB, a value "01" at an intermediate CNR equal to or larger than 4 dB and smaller than 9 dB, and a value "10" at a low CNR smaller than 4 dB.

The logical gate circuit 11 receives the signals A1 and A0 output from the frame sync timing circuit 4 and the CNR code output from the CNR measuring circuit 10, and outputs the carrier filter control signal (CRFLGP) and gain control signal (GCONT).

Figures 11, 12:
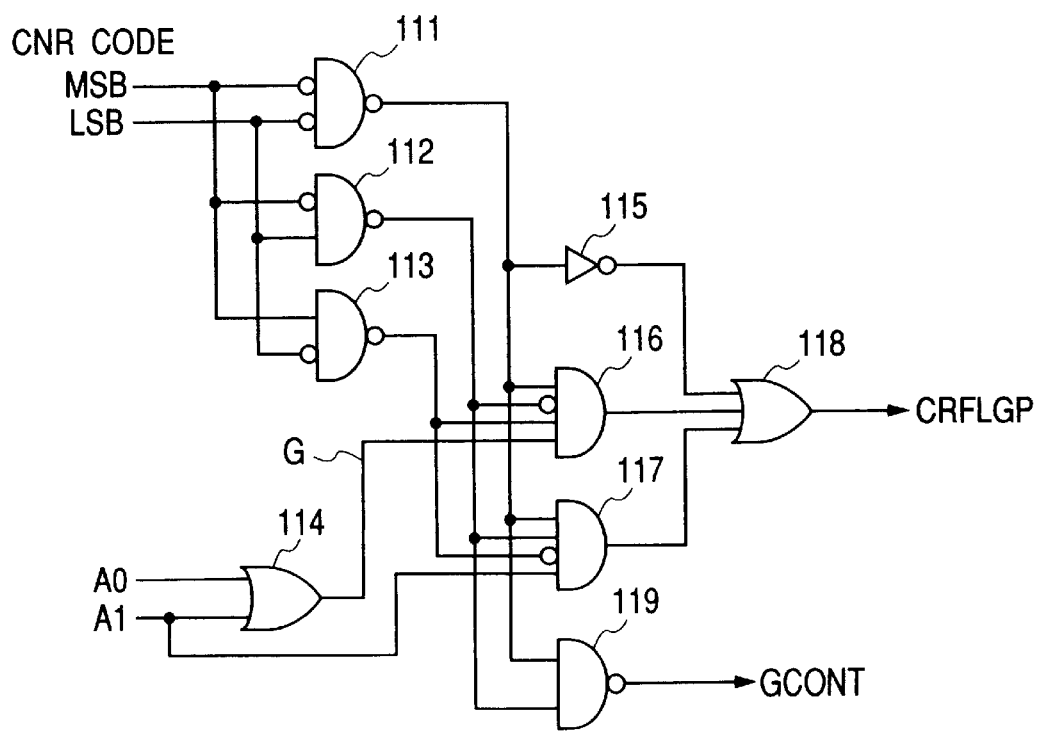
FIG. 11 is a diagram showing the relation between a CNR code output from a CNR measuring circuit and a C/N value of the digital broadcasting receiver according to the embodiment of the invention.
FIG. 12 is a block diagram showing a logical gate circuit of the digital broadcasting receiver according to the embodiment of the invention.

More specifically, as shown in FIG. 12, the logical gate circuit 11 has: NAND gates 111, 112 and 113 for receiving the CNR code and outputting signals corresponding to the high, intermediate and low C/N values; an OR gate 114 for receiving the signals A1 and A0 and outputting a signal G such as shown in FIG. 2(d) which takes a high potential in the sections of the BPSK signal, burst symbol signal and QPSK signal; an inverter 115 for outputting a high potential signal at the high C/N value; a NAND gate 116 for outputting the signal G at the intermediate C/N value; a NAND gate 117 for outputting the signal A1 at the low C/N value; an OR gate 118 for receiving the outputs from the inverter 115 and NAND gates 116 and 117 and outputting the carrier filter control signal (CRFLGP); and a NAND gate 119 for outputting the high potential gain control signal (GCONT) at the high or low CNR.

At the high C/N value, the logical gate circuit 11 outputs the high potential carrier filter control signal (CRFLGP) irrespective of the discriminated mode (in any section of the header, burst symbol signal, QPSK signal and 8PSK signal), at the intermediate C/N it outputs the high potential carrier filter control signal (CRFLGP) in any section of the header, burst symbol signal and QPSK signal, and at the low C/N it outputs the high potential carrier filter control signal (CRFLGP) in any section of the header and burst symbol signal. In other cases, the low potential carrier filter control signal (CRFLGP) is output. The logical gate circuit 11 also outputs the high potential gain control signal (GCONT) at the high or intermediate C/N, and the low potential gain control signal at the low C/N.

When the high potential carrier filter control signal (CRFLGP) is output, the carrier filter 7 executes a filtering operation to smooth and output the phase error voltage. When the low potential carrier filter control signal (CRFLGP) is output, the carrier filter 7 stops the filtering operation so that the output immediately before the stop is held and output. When the high potential gain control signal (GCONT) is output, the gain control circuit 8 amplifies the output of the carrier filter 7 two times and outputs it. When the low potential gain control signal (GCONT) is output, the gain control circuit 8 outputs the output of the carrier filter 7 as it is.

The digital filter 91, which receives the phase error voltage from the carrier reproduction phase error detection circuit 6 and supplies its output to the peak number calculation circuit 92, is set with a relatively long time constant to the degree that the peak number can be detected. The digital filter 93, which receives the phase error voltage and supplies its output to the differential coefficient calculation circuit 94, is set with a relatively short time constant to the degree that the differential coefficient can be calculated correctly.

Figure 13A:
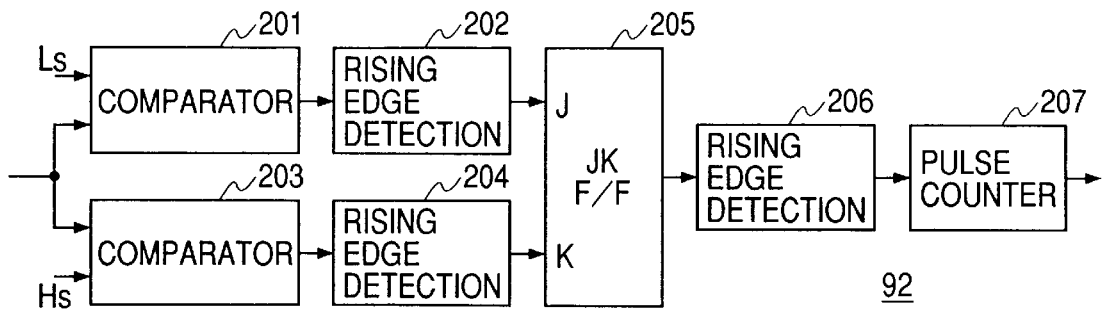
FIGS. 13(a) to 13(c) are diagrams showing a circuit of calculating a peak number of a phase error voltage of the digital broadcasting receiver and waveforms illustrating the operation of the circuit, according to the embodiment of the invention.

As shown in FIG. 13(a), in the peak number calculation circuit 92 receiving the phase error voltage whose noises were removed by the digital filter 91, a comparator 201 compares the phase error voltage value with a first threshold value LS and outputs a high potential level while the phase error voltage takes a value equal to or higher than the first threshold value. A rising edge detection circuit 202 detects a rising edge of the output from the comparator 201. A comparator 203 compares the phase error voltage value with a second threshold value HS higher than the first threshold value and outputs a high potential level while the phase error voltage takes a value equal to or higher than the second threshold value. A rising edge detection circuit 204 detects a rising edge of the output from the comparator 203. A JK flip-flop 205 is set or reset in accordance with the edges detected by the edge detection circuits 202 and 204. A rising edge detection circuit 206 detects a rising edge of a Q output of the JK flip-flop 205, and the number of outputs from the rising edge detection circuit 206 is counted by a counter 207 to obtain the peak number. This peak number corresponds to the error frequency between the desired reception frequency and reproduction carrier frequency.

Figure 13B:
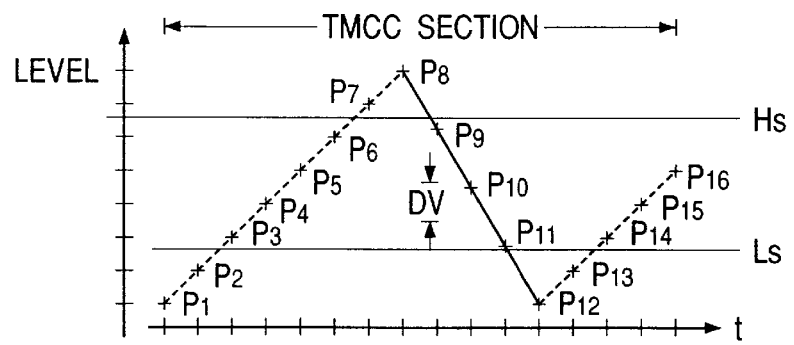
Figure 13C:
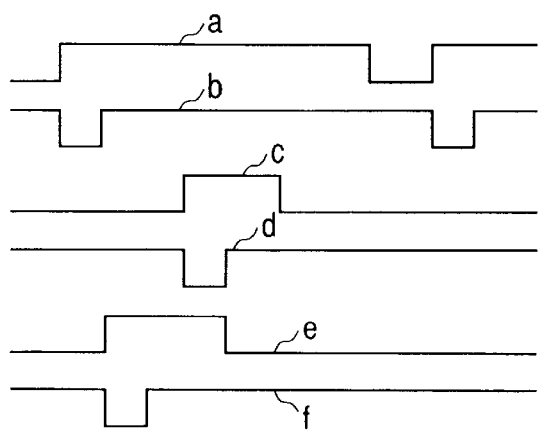

For example, if the phase error voltage during the TMCC section supplied to the peak number calculation circuit 92 is such as shown in FIG. 13(b), an output a is supplied from the comparator 201 and an output b is supplied from the rising edge detection circuit 202, as shown in FIG. 13(c), whereas an output c is supplied from the comparator 203 and an output d is supplied from the rising edge detection circuit 204. An output e is supplied from the JK flip-flop 205, and an output f is supplied from the rising edge detection circuit 206. Outputs f are counted by the counter 207 to obtain the peak number of "1".

Figure 14:
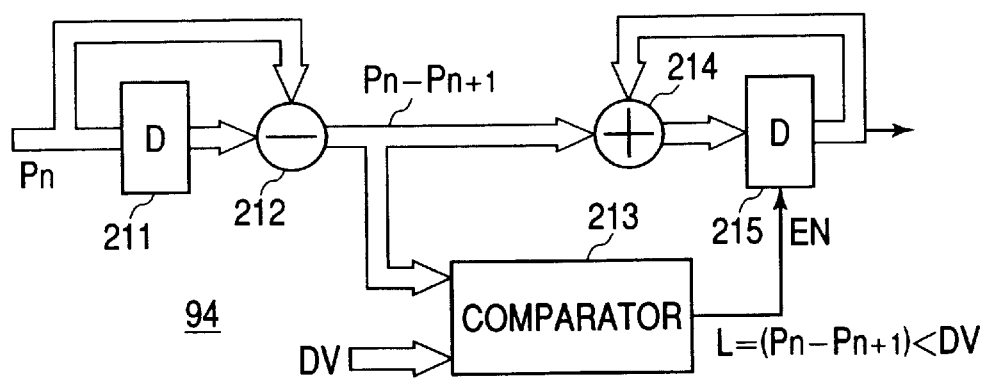
FIG. 14 is a block diagram showing the structure of a circuit of calculating a differential coefficient of a phase error voltage of the digital broadcasting receiver according to the embodiment of the invention.

As shown in FIG. 14, in the differential coefficient calculation circuit 94 receiving the phase error voltage whose noises were removed by the digital filter 93, the phase error voltage is supplied to a unit time delay circuit 211 to delay it. A subtractor circuit 212 subtracts the phase error voltage not delayed from the phase error voltage delayed by the unit time delay circuit 211. An adder 214 adds the phase error voltage delayed by a unit time delay circuit 215 to an output of the subtractor circuit 212. An output of the adder 214 is supplied to the unit time delay circuit 215 to delay it. A comparator 213 compares an output of the subtractor 212 with a threshold value DV. If the output of the subtractor circuit 212 is not higher than the threshold value DV, the comparator 213 enables the unit time delay circuit 215 to calculate only the smaller inclination of the differential coefficient and obtains the inclination direction of the differential coefficient from the polarity of the output from the unit time delay circuit 215.

In the differential coefficient calculation circuit 94, the threshold value DV is set to, for example, "2". In the differential coefficient calculation circuit 94, an output of the subtractor circuit 212 is represented by $\{P_n-(P_{n+1})\}$ and the unit time delay circuit 215 is enabled if $\{P_n-(P_{n+1})\}<DV$. Therefore, if the phase error voltage during the TMCC section supplied to the differential coefficient calculation circuit 94 is as shown in FIG. 13(b) and the phase error voltage at each unit time interval is represented by $P_i$ (i=1 to 16), each phase error voltage $P_i$ is as shown in FIG. 13(b).

An output of the unit time delay circuit 215 is (P1−P2)+ (P2−P3)+(P3−P4)+(P4−P5)+(P5−P6)+(P6−P7)+(P7−P8)+

(P8−P9)+(P9−P10)+(P10−P11)+(P11−P12)+(P12−P13)+ (P13−P14)+(P14−P15)+(P15−P16)=(−1)+(−1)+(−1)+(−1)+ (−1)+(−1)+(−1)+2+(3: not added since (3=P9−P10)>2)+2+ 2+(−1)+(−1)+(−1)+(−1)=−5. The sign is minus (−) which is the direction of the differential coefficient.

The direction of the differential coefficient is obtained by setting the threshold value DV as described above. The reason for this is that if the differences $\{P_i−(P_{i+1})\}$ both in the increase direction and decrease direction are calculated and added together, this addition is always "0" and the direction of the differential coefficient cannot be obtained.

Figure 15A:
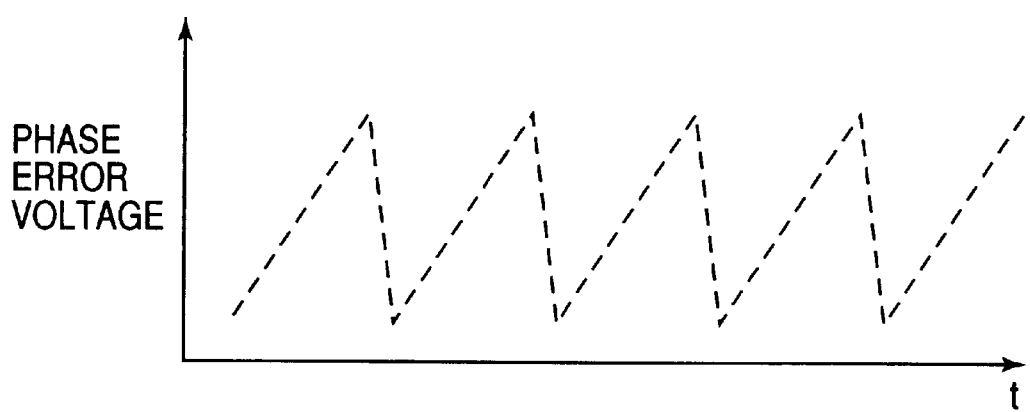
FIGS. 15(a) and 15(b) show waveforms of a phase error voltage illustrating the relation between a desired reception frequency and a reproduction carrier frequency of the digital broadcasting receiver according to the embodiment of the invention
Figure 15B:
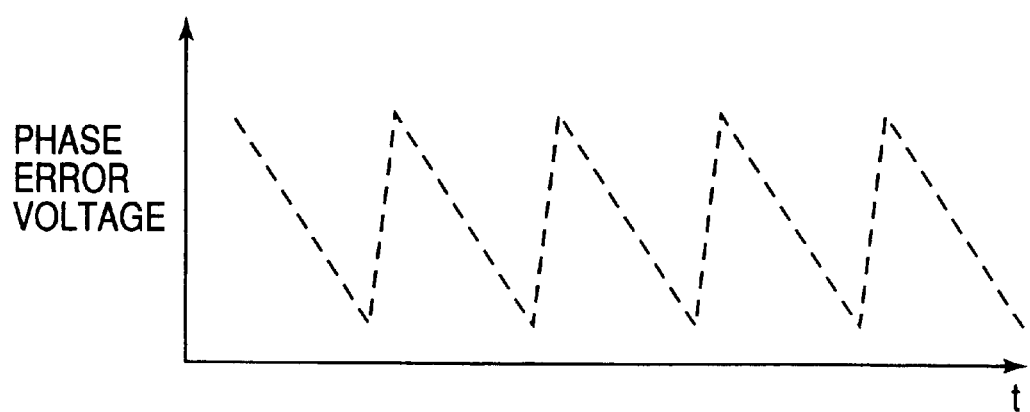

If the desired reception frequency is higher than the reproduction carrier frequency, the phase error voltage during the TMCC section output from the digital filter 93 is as shown in FIG. 15(*a*) corresponding to the case illustratively shown in FIG. 13(*b*). If the desired reception frequency is lower than the reproduction carrier frequency, the phase error voltage during the TMCC section output from the digital filter 93 is as shown in FIG. 15(*b*) and the direction of the differential coefficient is plus (+). As apparent from this, the direction of the differential coefficient corresponds to the polarity of the error frequency.

Figure 16:
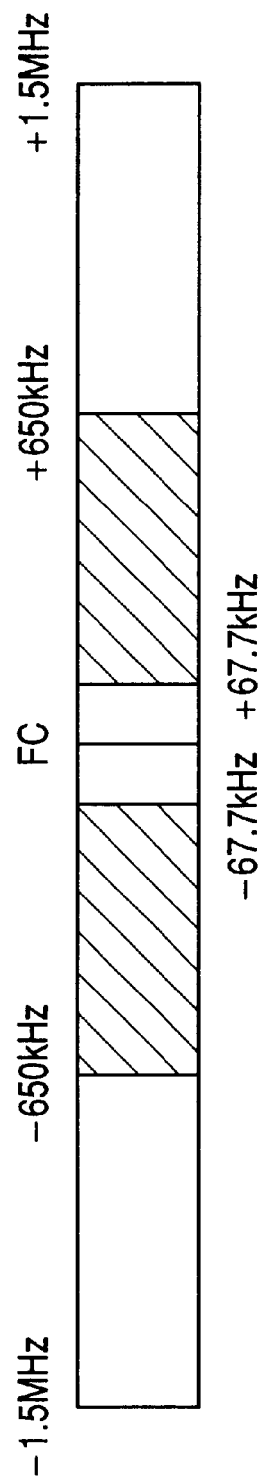
FIG. 16 is a diagram illustrating the step frequency widths of the digital broadcasting receiver according to the embodiment of the invention

Since the center frequency of a desired reception frequency shifts by about ±1.5 MHz from the rated frequency, the frequency of the reproduction carrier tuned with the desired reception frequency is scanned in a range of about ±1.5 MHz. This scanning is schematically shown in FIG. 16. In FIG. 16, FC represents the frequency of the reproduction carrier tuned with the desired reception frequency.

Of the range of about ±1.5 MHz for scanning the frequency of the reproduction carrier, in the frequency scanning range of ±67.7 kHz from FC, it is difficult to estimate the error frequency and its polarity from the phase error voltage during the TMCC section although the frame sync can be captured. The reason is that since this frequency scanning range is near the frequency of the desired reception signal, the peak number cannot be detected from the phase error voltage, and moreover since the inclination angle is small, it is difficult to obtain the direction of the differential coefficient. This range is obtained by {(phase margin of BPSK of 1800/bit number in the TMCC section of 192)× symbol rate of 26 Msps}/3600=67.7 kHz.

The frequency range capable of capturing the frame sync and estimating the error frequency and its direction from the phase error voltage during the TMCC section is shown by hatched portions in FIG. 16. In this frequency range, the peak number and the direction of the differential coefficient can be obtained from the phase error voltage. This frequency range is from 67.7 kHz to 650 kHz and from −67.7 kHz to −650 kHz, where {(phase margin of BPSK of 1800/bit number of sync pattern of 20)×symbol rate of 26 Msps}/360=650 kHz. For example, therefore, scanning is executed in 65 kHz width×peak number after the frame sync is detected.

The frame sync cannot be captured in the rage from +650 kHz to +1.5 MHz and from −650 kHz to −1.5 MHz.

Figure 17:
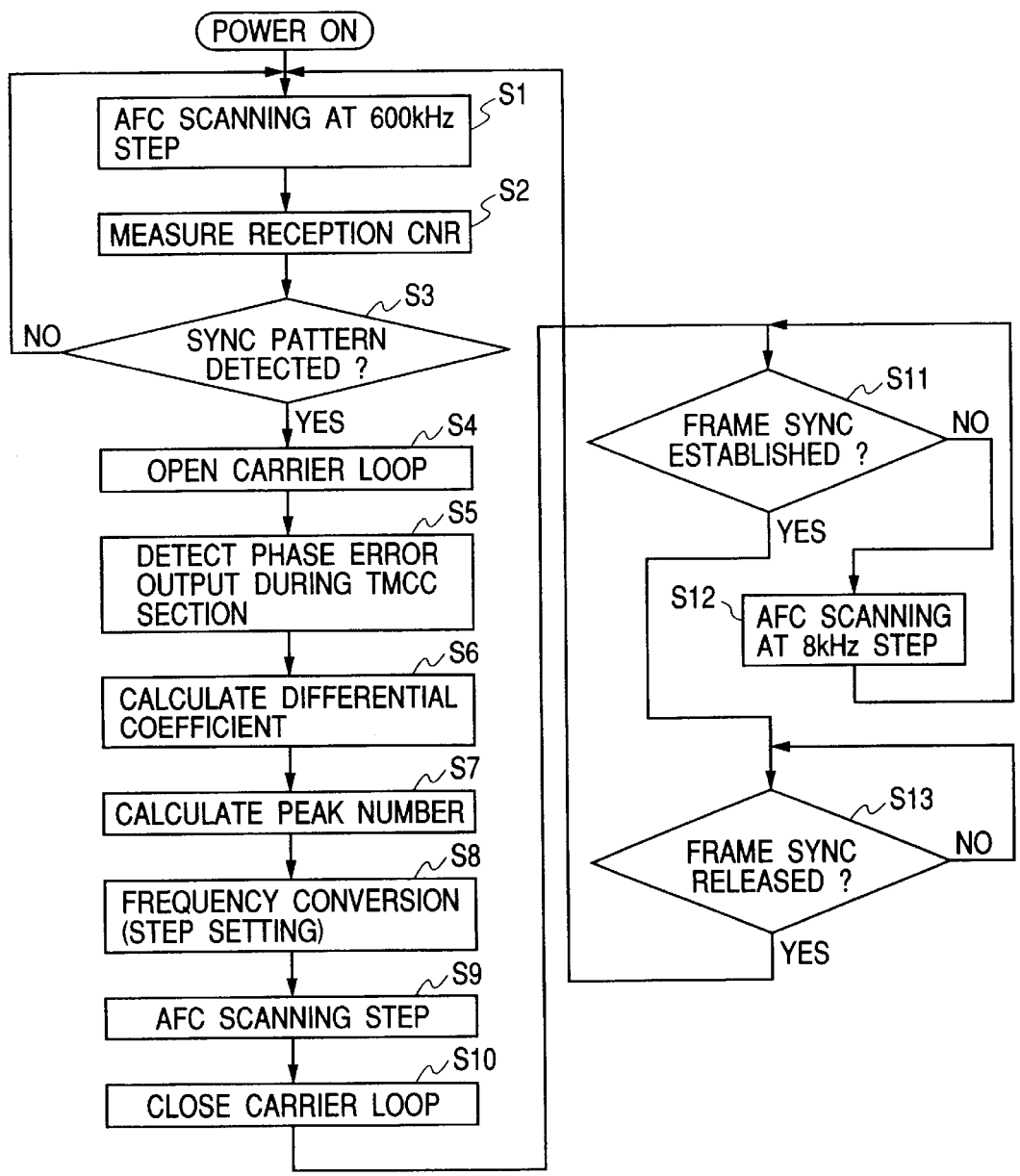
FIG. 17 is a flow chart illustrating the operation of the digital broadcasting receiver according to the embodiment of the invention

Next, the operation of the digital broadcasting receiver including the AFC circuit of this invention constructed as above will be described with reference to the flow chart of FIG. 17.

AFC scanning is executed in a 600 kHz width given some margin relative to the 650 kHz width described above, in accordance with an output of the step frequency control circuit 96 (Step S1). Then, a reception C/N ratio is measured (Step S2) and it is checked (Step S3) whether the sync pattern is detected. Until the sync pattern is detected, Steps S1 to S3 are repeated. Since the frequency scanning is performed in the frequency range of 600 kHz relative to the frequency scanning range of ±1.5 MHz, a time taken to detect the frame sync is short.

The details of the operation at Steps S1 to S3 are as follows.

The arithmetic circuit 1 multiplies the baseband signals i and q by the quadrature reproduction carriers output from the numerical control oscillator 2 to detect the baseband signals ID and QD which are supplied via the roll-off filter 3 to the frame sync timing circuit 4. The frame sync timing circuit 4 supplies the TMCC pattern to the transmission mode judging circuit 5 which decodes the TMCC pattern and sends the transmission mode signal back to the frame sync timing circuit 4.

Upon reception of the baseband signals ID and QD and the transmission mode signal, the frame sync timing circuit 4 detects the frame sync pattern and outputs the frame sync signal SYNC and signals A1 and A0. The frame sync signal FSYNC is supplied to the gain control circuit 8 to reset the gain control circuit 8 each time the frame sync is detected. The signals A1 and A0 are supplied to the carrier reproduction phase error detection circuit 6 and logical gate circuit 11.

In accordance with the baseband signals ID and QD and signals A1 and A0, the carrier reproduction phase error detection circuit 6 selects the phase error table to detect the phase error voltage which is supplied to the carrier filter 7 to smooth it. The CNR measuring circuit 10 receiving the baseband signals ID and QD counts DSMS in accordance with the signal point arrangement of the baseband signals ID and QD. In accordance with the counted DSMS, a C/N value is calculated which is output as the CNR code.

Upon reception of the CNR code and signals A1 and A0, the logical gate 11 judges whether the C/N value is a high C/N, an intermediate C/N, or a low C/N. If high or intermediate C/N, a high potential gain control signal (GCONT) is supplied to the gain control circuit 8 to set a high loop gain so that the phase error voltage output from the carrier filter 7 is doubled. If the logical gate circuit 11 judges that the C/N is the low C/N, a low potential gain control signal (GCONT) is supplied to the gain control circuit 8 to set a low loop gain so that the phase error voltage output from the carrier filer 7 is output at it is.

When the sync pattern is detected at Step S3, the gate circuit 100 is controlled to be in the closed state (Step S4) and the phase error voltage during the TMCC section is detected (Step S5). In accordance with the phase error voltage detected at Step S5, the direction of the differential coefficient of the phase error voltage is calculated (Step S6). After the direction of the differential coefficient is calculated at Step S6, the peak number of the phase error voltage is calculated (Step S7).

The step frequency conversion circuit 95 converts the peak number into the step frequency control voltage which is obtained by multiplying the peak number calculated at Step S7 by 65 kHz, to thereby set the step frequency control voltage (Step S8). Frequency scanning is executed at the frequency step corresponding to the step frequency control voltage set at Step S8, starting from the frequency of the reproduction carrier used for scanning at Step S3 (Step S9). This frequency 65 kHz has a margin relative to the frequency 67.7 kHz described earlier.

The direction of the frequency step at Steps S8 and S9 corresponds to the direction of the differential coefficient of the phase error voltage calculated at Step S6. If the direction of the differential coefficient calculated from the phase error voltage is minus (−), it means that the desired signal frequency is higher than that of the reproduction frequency. Therefore, the frequency of the reproduction carrier is lowered. If the direction of the differential coefficient calculated at Step S6 from the phase error voltage is plus (+), it means that the desired signal frequency is lower than that of the reproduction frequency. Therefore, the frequency of the reproduction carrier is raised.

After Step S9, the gate circuit 100 is controlled to be in the conductive state (Step S10). Next, it is judged whether the frame sync is captured a plurality of consecutive times, i.e., whether the frame sync is established (Step S11). If it is judged at Step S11 that the frame sync is not established, frequency scanning is executed in the capture range, e.g., at an 8 kHz width to establish the frame sync (Step S12).

If it is judged at Step S11 that the frame sync has been established, the counter 98 is incremented or decremented in response to the tracking signal generated by the tracking circuit 12 in accordance with the phase error signal detected by the carrier reproduction phase error detection circuit 6. Therefore, the frequency of the reproduction carrier is made to follow a change in the desired reception frequency to maintain the frame sync state. If it is judged at Step S13 that the frame sync is released, the above operations are repeated from Step S1.

As described so far, according to the digital broadcasting receiver of the embodiment of the invention, the frequency scanning step of AFC can be set wide until the scanning enters the frequency range which can have sync capture and estimate the peak number and the direction of the differential coefficient of the phase error voltage during the TMCC section. The scanning frequency range is approximately a half of the conventional range of AFC so that the frequency scanning time can be shortened.

After the frequency scanning at the wide scanning step enters the frequency range which can estimate the peak number and the direction of the differential coefficient of the phase error voltage, the frequency scanning is executed in accordance with the detected peak number and the direction of the differential coefficient of the phase error voltage. Accordingly, the carrier can be reproduced quickly and the desired signal can be captured at high speed. After the frame sync is established, the tracking signal makes the reproduction carrier frequency follow the change in the desired reception frequency to thereby maintain the frame sync state.

INDUSTRIAL APPLICABILITY OF THE INVENTION

As described so far, according to the digital broadcasting receiver of the invention for receiving modulation waves modulated by a hierarchical transmission method, it is possible to capture a frame sync quickly, and after the frame sync is captured once, the frequency scanning is executed in accordance with the detected peak number and the direction of the differential coefficient of the phase error voltage. Accordingly, the carrier can be reproduced quickly and the desired signal can be captured at high speed.

Furthermore, according to the digital broadcasting receiver of this invention, after the frame sync is established, the tracking signal makes the reproduction carrier frequency follow the change in the desired reception frequency to thereby maintain the frame sync state.

What is claimed is:

1. A digital broadcasting receiver having an automatic frequency control circuit used for carrier reproduction for receiving a hierarchical digital modulated wave, comprising:

phase error detecting means for detecting a phase error voltage in accordance with a demodulation output obtained by demodulating the modulated wave during a predetermined section in a header section;

error frequency calculating means for calculating an error frequency between a desired reception frequency and a reproduction carrier frequency in accordance with the detected phase error voltage;

polarity calculating means for calculating a polarity of the error frequency in accordance with the detected phase error voltage; and converting means for converting the detected error frequency having the calculated polarity into a step frequency width for automatic frequency control, wherein the reproduction carrier frequency is scanned at the converted step frequency width until a frame sync is established after the frame sync is detected.

2. A digital broadcasting receiver according to claim 1, further comprising a tracking circuit for generating a tracking signal in accordance with the phase error voltage, to thereby make the reproduction carrier frequency follow a change in the desired reception frequency in accordance with the tracking signal, after the frame sync is established.

3. A digital broadcasting receiver having an automatic frequency control circuit used for carrier reproduction for receiving a hierarchical digital modulated wave, comprising:

converting means for converting an error frequency between a desired reception frequency and a reproduction carrier frequency calculated from a phase error voltage obtained in accordance with a demodulation output obtained by demodulating the modulated wave, into a step frequency width for automatic frequency control, wherein the reproduction carrier frequency is scanned at the converted step frequency width until a frame sync is established after the frame sync is detected.

* * * * *